US006598231B1

(12) United States Patent
Basawapatna et al.

(10) Patent No.: US 6,598,231 B1
(45) Date of Patent: Jul. 22, 2003

(54) ENHANCED SECURITY COMMUNICATIONS SYSTEM

(75) Inventors: Ganesh Basawapatna, Greenwood Village, CO (US); Varalakshmi Basawapatna, Greenwood Village, CO (US)

(73) Assignee: Asvan Technology, LLC, Englewood, CO (US)

( * ) Notice: Subject to any disclaimer, the term of this patent is extended or adjusted under 35 U.S.C. 154(b) by 0 days.

(21) Appl. No.: 09/149,194

(22) Filed: Sep. 8, 1998

(51) Int. Cl.[7] .............................................. H04N 7/173
(52) U.S. Cl. ...................... 725/120; 725/119; 725/106
(58) Field of Search ............................. 725/25, 27, 28, 725/119, 120, 132, 106, 104, 78, 111; 370/400, 408; H04N 7/16, 7/18, 7/173

(56) References Cited

U.S. PATENT DOCUMENTS

| | | | |
|---|---|---|---|
| 3,889,050 A | | 6/1975 | Thompson |
| 3,990,012 A | | 11/1976 | Karnes |
| 4,331,974 A | | 5/1982 | Cogswell et al. |
| 4,475,123 A | | 10/1984 | Dumbauld et al. |
| 4,823,386 A | | 4/1989 | Dumbauld et al. |
| 4,829,560 A | | 5/1989 | Evanyk et al. |
| 4,901,367 A | | 2/1990 | Nicholson |
| 5,220,420 A | | 6/1993 | Hoarty et al. |
| 5,243,647 A | | 9/1993 | Parikh et al. |
| 5,247,347 A | | 9/1993 | Litteral et al. |
| 5,382,971 A | | 1/1995 | Chanteau |
| 5,408,260 A | | 4/1995 | Arnon |
| 5,495,483 A | | 2/1996 | Grube et al. |
| 5,521,906 A | | 5/1996 | Grube et al. |
| 5,604,528 A | * | 2/1997 | Edwards et al. .............. 725/25 |
| 5,613,190 A | | 3/1997 | Hylton |
| 5,719,872 A | * | 2/1998 | Dubberly et al. ........... 370/487 |
| 5,774,527 A | | 6/1998 | Handelman et al. |
| 5,790,176 A | | 8/1998 | Craig |
| 5,790,806 A | * | 8/1998 | Koperda ..................... 709/252 |
| 5,847,660 A | * | 12/1998 | Williams et al. ............ 370/227 |
| 5,847,751 A | | 12/1998 | Safadi |
| 5,905,941 A | * | 5/1999 | Chanteau .................... 725/127 |
| 5,917,830 A | * | 6/1999 | Chen et al. .................. 370/487 |
| 6,057,872 A | * | 5/2000 | Candelore .................... 725/23 |
| 6,188,871 B1 | * | 2/2001 | Kitamura et al. ........... 725/120 |
| 6,243,446 B1 | * | 6/2001 | Goodman ................. 379/93.01 |

* cited by examiner

Primary Examiner—Vivek Srivastava
Assistant Examiner—Andrew Y Koenig
(74) Attorney, Agent, or Firm—Robert G. Crouch; Marsh Fischmann & Breyfogle LLP

(57) ABSTRACT

A telecommunications system for providing telecommunication services to a plurality of users. The system includes a signal collection and transmission circuit or headend circuit for collecting and transmitting telecommunication signals to the user. In addition, the system comprises a signal distribution system or circuit operatively connected to the signal collection and transmission circuit for receiving and transmitting telecommunication signals therefrom and thereto. The system includes a user or customer interface device operatively connected to an associated signal distribution circuit for both receiving telecommunication signals from the associated signal distribution circuit and transmitting telecommunication signals to the associated signal distribution circuit. The signal distribution circuit is formed by a node having a plurality of output lines and a service module operatively connected to one of the node output lines. The service module further includes a signal splitter having a plurality of output lines, a user service module circuit operatively connected to one of the splitter output lines, and a processor control circuit operatively controlling the service module.

64 Claims, 7 Drawing Sheets

ENHANCED SECURITY COMMUNICATIONS SYSTEM

BACKGROUND OF THE INVENTION

The present invention relates generally to a communications system for collecting and distributing selected forms of communication signals, and more particularly to a novel communications system for collecting and distributing television, telephone, and data signals to and from an end user's site.

Mechanisms are known for coupling communication signals by fiber optic or coaxial cable directly to a television receiver or through an interface box to the television receiver. These signals, however, are highly susceptible to theft or diversion to other than the subscribing users. A person desiring to steal the signal may tap into the cable line of an intended user or use hardware and/or software which enables reception and interpretation of unauthorized signals or channels.

Known semi-secure communication systems have made use of complex set-top boxes and receiver interfaces. Such systems are costly and often include more features than users require or need, thus increasing the cost of the interface. Furthermore, in many areas and countries, the bandwidth for communications systems is limited, usually to 300 MHz, as are the number of channels in most television receivers.

A typical head end of a communication distribution system receives analog and digitally compressed signals, modulates the signals onto different carrier frequencies, combines the signals, and sends the signals by fiber-optic or coaxial cable to various electronic nodes, each of which typically serves a large number of users, often as many as 300 or more. At the node, the signal may be distributed directly or be converted to those frequencies compatible with equipment at the user site. Between the head end and the distribution nodes, the path is controlled and secure and thus the signal is difficult to tamper with. Between the nodes and a subscribing user, however, a number of major problems can occur. The signal may be stolen by tapping into the cable, channels may be descrambled using unauthorized descrambling equipment, and the reception of extraneous signals can cause the quality of signal reception at the user's site to be poor. Finally, with much of the prior art equipment, there is no reverse path which enables a subscribing user to communicate with the signal provider other than through the use of conventional telephone equipment and procedures. This makes the provision of value added services, such as telephone and computer services dependent upon the telephone company for the return path communications.

What is needed is more secure one-way communication channels.

SUMMARY OF THE INVENTION

According to the invention, a telecommunication system for providing telecommunication services to a plurality of users comprises a signal collection and transmission system (also referred to as a headend system) for collecting and transmitting telecommunication signals, at least one signal distribution system operatively connected to the signal collection and transmission system that receives the telecommunication signals from the signal collection and transmission system and transmits or distributes the telecommunication signals, via service modules according to the invention, to a plurality of users, which communicate with customer interface boxes ("CIB") which both receive signals as well as send requests for telecommunication services to the signal distribution system.

The signal distribution system preferably comprises one or more nodes, each having one or more communication lines for connecting to service modules. The service modules preferably connect to the CIB configured to control and authorize telecommunication service requests from the customer communication devices.

A more complete understanding of the present invention may be derived by referring to the detailed description of preferred embodiments and claims when considered in connection with the figures, wherein like reference numbers refer to similar items throughout the figures.

DESCRIPTION OF PREFERRED EMBODIMENTS

Figure 1:
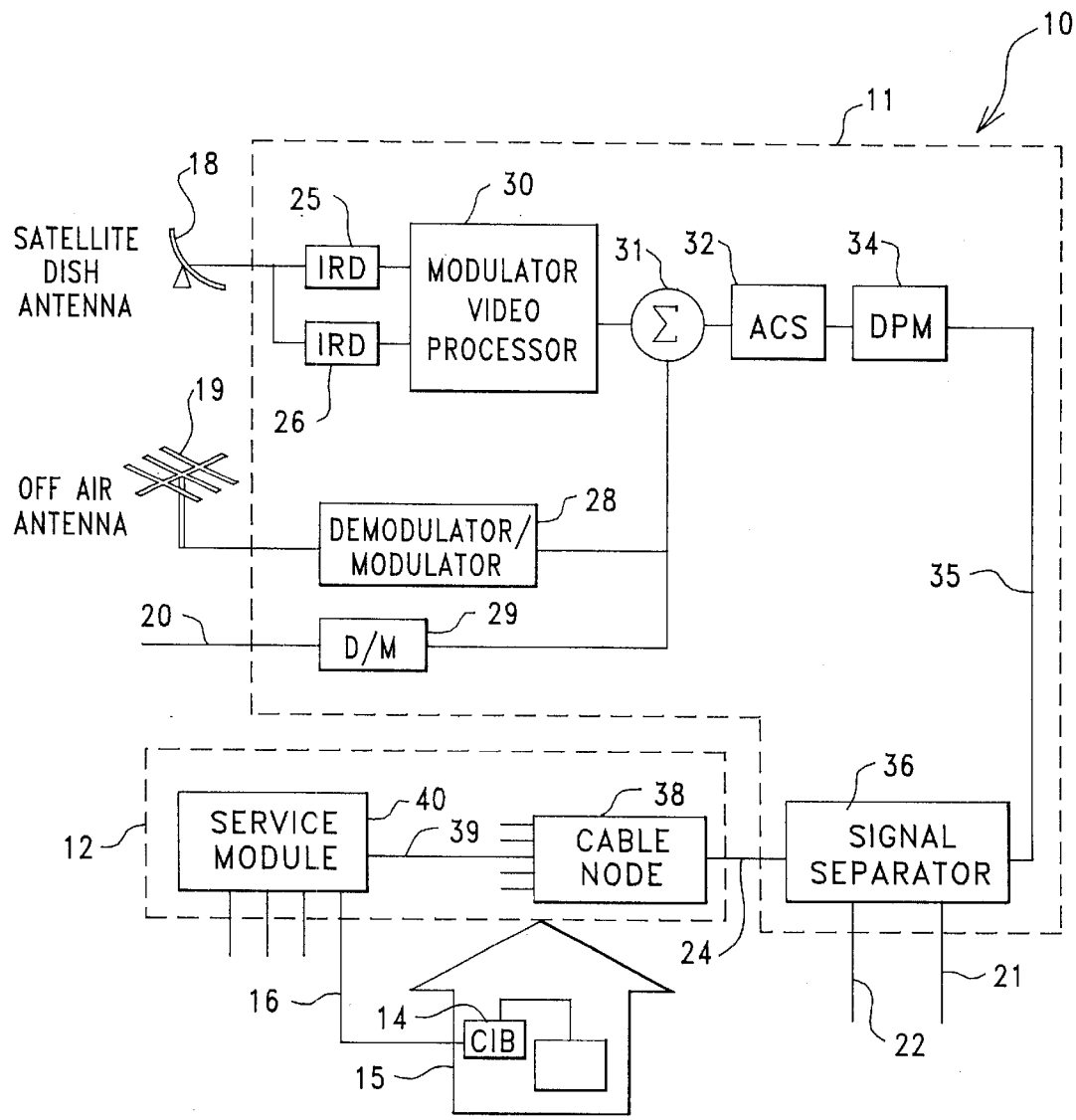
FIG. 1 is a schematic diagram of a telecommunications system embodying the present invention.

The present invention is embodied in a telecommunications system 10, as shown in FIG. 1, formed by a signal collection and transmission system or circuit 11, sometimes referred to as a headend system, and a signal distribution system or circuit 12, both of which preferably are located at a secured site or sites. A customer interface box ("CIB") 14, located at a user or subscriber site 15, is operatively connected to the signal distribution system 12 by a suitable connection cable 16, such as a coaxial cable, fiber-optic cable, twisted-pair cable, or other suitable wide bandwidth connection means.

In accordance with a preferred embodiment of the present invention, the user site may be a home, office, business, or the like. Such a site typically is not a secure site, so signals received from the telecommunication system headend may be susceptible to theft or misappropriation. By utilizing the unique signal distribution system or circuit 12 embodying the present invention located at a secured site, the signals to and from the user site are limited to those specifically requested by the user, and thus, a substantial improvement in the security of the system is achieved.

At signal collection or headend system 11, signals, such as cable, broadcast, pay-per-view, and video on demand signals, are received from a variety of sources, such as one or more satellite dish antennas 18, one or more off the air antennas 19, and/or a wide bandwidth cable source 20 carrying a signal from a master headend system (not shown). Additionally, the signal collection or headend circuit 11 desirably includes one or more connections 21 to a telephone network, and one or more connections 22 to a computer system server, such as an internet connection, or the like.

In accordance with a preferred embodiment of the present invention, signal collection or headend system 11 preferably provides an output signal through a communication connection 24 to signal distribution system or circuit 12. Communication connection 24 may comprises any suitable high-speed or wide bandwidth connection, but in accordance with a preferred embodiment of the present invention, communication connection 24 comprises a coaxial cable connection or a fiber-optic cable connection. The output signal from signal collection or headend system 11, which is sent through connection 24 to signal distribution system 12, preferably comprises a combination of video and/or television signals for a plurality of channels, as well as telephone, computer data, and system information signals, which signal collection or headend system 11 generates or receives from its various sources.

Still referring to FIG. 1, satellite dish antenna 18 may receive analog or digitally compressed video channels from various satellites. In accordance with one aspect of the present invention, the signals received by satellite antenna 18 preferably are analog. In particular, the analog signals are received from the satellite in a frequency range between about 3.7 and about 4.2 GHz. The analog signal then passes to a low noise block converter (LNB) (not shown) which converts the signal to L-band frequencies (about 950 to about 1450 MHz or higher). Next, the signal passes to one or more integrated receiver decoders ("IRDs") 25 which converts each channel residing in the L-band frequency to a baseband frequency. Thus, as one skilled in the art will appreciate, it is preferable to have one IRD for each channel residing in the signal. From IRDs 25, the individual baseband channels are modulated to a channel (i.e., carrier frequency) chosen by the cable system operator by modulator video processor 30. In addition, modulator video processor may be configured to encrypt the signals or otherwise scramble the signals so that only the paying subscribers will be able to descramble or de-encrypt the signals.

As mentioned briefly above, satellite antennas 18 also may receive digitally compressed signals from the satellites. In accordance with this aspect of the invention, the signals may be handled in two different ways, one way for an analog only cable system, and one way for a digital or analog and digital cable system. If the cable system is purely an analog system, or if the cable operator decides to distribute particular digital channels on an analog channel line-up, then the digitally compressed signals are processed in the same manner as discussed above with respect to the analog signals, except that a digital IRD 25 will be used in place of an analog IRD. However, if the cable system has digital capabilities, and the cable system operator wishes to distribute the digital channels in digital form, then an integrated receiver transcoder ("IRT") is used to change the digital modulation and the error correction protocol from QPSK modulation to QAM modulation, which is suitable for cable transport. Then, modulator video processor 30 will modulate the digitally modulated RF signal to a desired RF channel position.

Typically, the off-air signals received by antenna 19 are not scrambled. Thus, in accordance with the present invention, the signals preferably pass to a demodulator/modulator unit 28 which demodulates the received signals to baseband and then remodulates the signal channels to the appropriate cable system channel frequency as selected by the cable operator. In addition, as one skilled in the art will appreciate, if the received off-air signal channel already is at the frequency which will be sent to the user's, then the demodulator/modulator 28 will not demodulate and remodulate the signal, but will merely pass the signal on.

Finally, signals received via wide bandwidth connection 20, are treated in the same manner as signals received by satellite antennas 18. That is, the signals are decoded and then demodulated and remodulated to a desired channel frequency.

The signals from modulator video processor 30 and the other video modulators/demodulators 28 and 29 then are combined and summed by a combiner circuit 31 into a single video signal. The single video signal preferably comprises all the channels that a customer or user of the system may desire or be capable of receiving. For example, the signal from combiner circuit 31 preferably comprises, local broadcast television channels, cable television channels, pay-per-view channels, and video on demand channels.

A video output signal from combiner circuit 31 then is transmitted to an access control system 32 and data path modulator 34. In accordance with a preferred embodiment of the present invention, access control system 32 keeps track of the user authorization for each channel. For example if a user purchases rights to receive certain cable channels, such as HBO, Showtime, pay-per-view channels, or the like, access control system 32 will keep track of the authorization of users to receive these channels. The authorization information for each user then typically is sent to the service modules 40 in a separate channel bandwidth frequency range. As discussed in more detail below, the authorization information then is used by the service modules to determine whether to send a requested channel to a particular user, or not. As one skilled in the art will appreciate, access control system 32 may comprise a suitable computer database and system for maintaining user authentication information.

Data path modulation 34 is configured to receive user authentication data, as well as other data, such as system messages, and the like, and modulate that data to a particular channel frequency. As one skilled in the art will appreciate, because the communication system of the present invention probably will have a large number of users, a large amount of user authentication data will be transmitted to the service modules 40. Therefore, it is preferable to send the information through the system on a one or more separate channels carrier frequencies, rather than appending the channel authentication information to the individual video channels.

After the data has been modulated to the appropriate frequency, the video and data signal then is sent through a high-speed or wide bandwidth connection 35, such as a fiber-optic or coaxial cable connection, to a signal separator 36. Telephone and computer connections 21 and 22 likewise are fed to signal separator 36. In accordance with a preferred embodiment of the present invention, signal separator 36 preferably produces a forward path signal which preferably includes of video, system data, telephone, and computer signals, and sends the forward path signal to distribution systems or circuits 12 through wide bandwidth communication connections 24. In addition, signal separator 36 preferably extracts telephone and/or computer signals from the reverse or return path signal of communication connection 24 and sends the telephone voice and/or computer data signals over telephone connection 21 and computer connection 22, respectively. Telephone connection 21 may be connected to a local exchange carrier or a long distance carrier, whichever is appropriate.

As illustrated in FIG. 1, the output signal from headend system 11 is transmitted through communication connection 24 to signal distribution system 12, which preferably comprises one or more cable nodes 38 and a plurality of service modules 40. Nodes 38 typically are fiber-optic or coaxial cable systems, or combinations thereof, and are constructed to meet the bandwidth requirements of the system. In conventional cable systems, such nodes each typically serve about 50 to 500 customers, and more preferably about 100 customers. In accordance with the present invention, each node 38 typically serves about 10 to about 40 service modules, and each service module in turn serves between about 10 and about 40 user sites.

At node 38 the signal typically is converted from fiber-optic to coaxial form (i.e., optical to RF) using an opto-electronic (O/E) converter circuit and then transmitted to service modules 40. As one skilled in the art will appreciate, as the signals pass to service modules 40, the signals may pass through a number of signal splitters or couplers and amplifiers. Since the signal between nodes 38 and service modules 40 have both forward and return paths, the splitters and amplifiers preferably are configured to handle the dual path mode.

In accordance with a preferred embodiment of the present invention, forward path communications (i.e. video and forward path telephone and data) between service modules 40 and customer interface boxes ("CIBs") 14 at the user sites 15 preferably occur either at baseband frequency or at a very low frequency channel, such as channels 2,3,4 or 5. The return path or reverse path communication from CIB 14 to service module 40 preferably comprises telephone, computer, and user request information from modem 66 and is modulated onto a carrier frequency between 5 and 50 MHz. As discussed in greater detail below, CIBs 14 need little built-in intelligence, but can be upgraded to a higher computational-level if desired.

Figure 2:
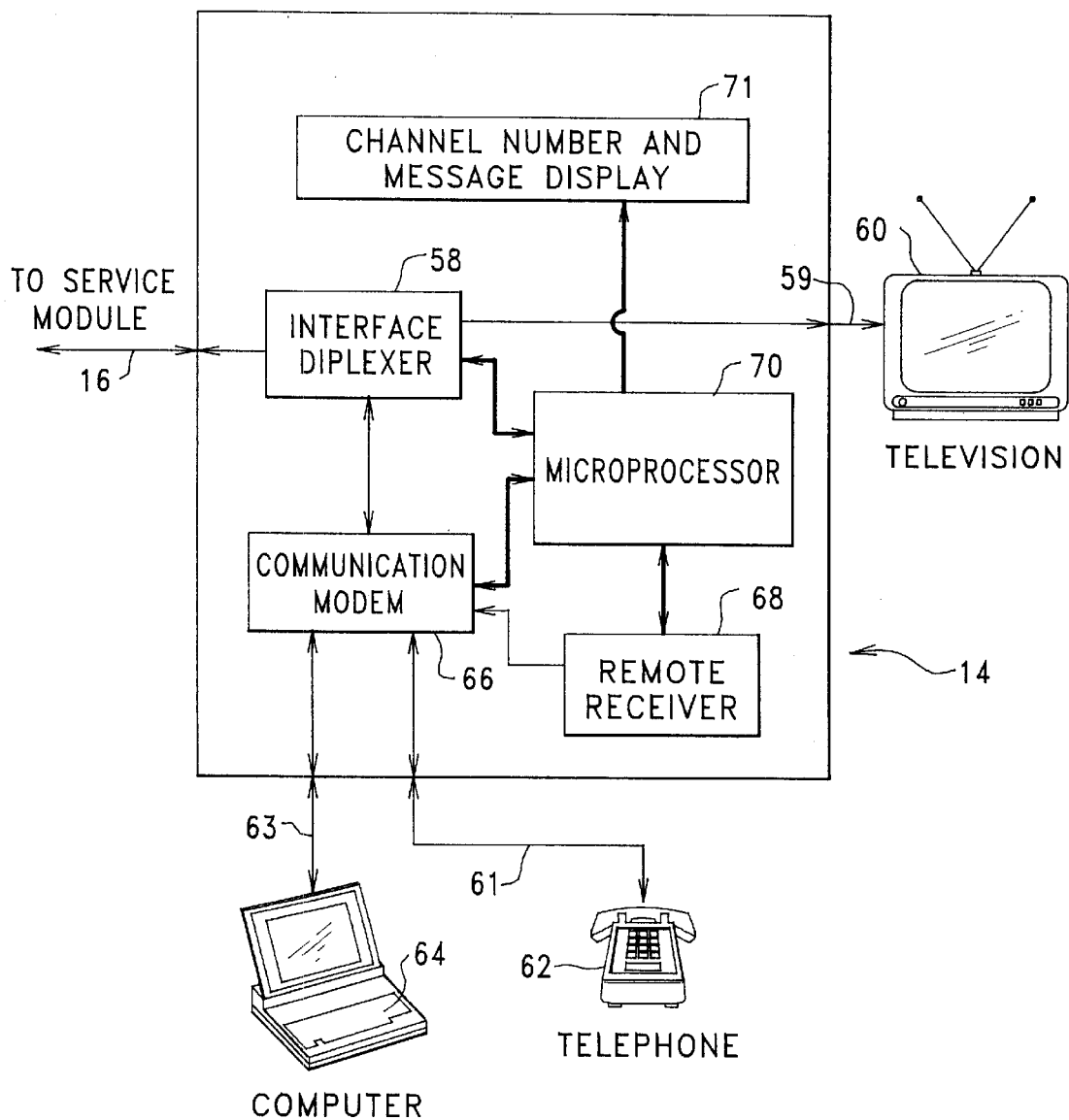
FIG. 2 is a schematic diagram of a user or customer communication device forming a part of the telecommunications system embodying the present invention.

Referring now to FIG. 2, a more detailed illustration of a customer interface box ("CIB") 14 is shown. In particular, CIB 14 preferably comprises an interface diplexer 58, a modem 66, a receiver 68, a processor 70, and a display device 71. In accordance with a preferred embodiment of the present invention, the signal from service module 40 is received at CIB 14 by interface diplexer 58 via connection 16. CIB 14, and in particular interface diplexer 58, is in turn connected by a connection 59 to one or more television sets 60. In addition, interface diplexer 58 is connected to one or more telephone sets 62 and one or more computers 64 by connections 61 and 63, respectively.

Interface diplexer 58 preferably filters the video signal(s) from the forward path and sends it to the one or more television sets 60 via connection(s) 59. Similarly, interface diplexer 58 filters out the forward path telephone, computer data and system message signals and sends them to modem 66. Finally, interface diplexer 58 receives return path information from modem 66, which is modulated on a carrier between 5 and 50 MHz and sends the carrier with the return path data back to service module 40.

In accordance with the illustrated embodiment, information from telephone set 62, computer 64 and receiver 68 preferably pass through modem 66, which converts the computer data, telephone voice and user request information to the proper form (i.e., analog or digital), and modulates the information to the return path frequency (e.g., 5–50 MHz). For example, if the signals passed between service module 40 and CIB 14 are in analog form, the digital computer signals from computer 64 preferably should be converted to analog form and modulated to the proper return path frequency by modem 66 before they are passed over communication connection 16 to service module 40. Similarly, computer signals received by CIB 14 in analog form should be converted to digital form before being passed to computer 64. Also, as one skilled in the art will appreciate, even if the signals between service module 40 and CIB 14 are digital signals, modem 66 still is needed to modulate the return path information to the proper frequency, and the modem may be needed to facilitate the return path communication protocol.

As illustrated in FIG. 2, CIB 14 further comprises receiver 68 for receiving user request signals. For example, receiver 68 may be configured to receive user request and message information from a remote control device, or receiver 68 may have a cable connection to a signal source (not shown). Thus, CIB 14, is addressable by means of a conventional hand-held remote control unit or other similar control device.

The operation of CIB 14 preferably is controlled by an internal processor 70. For example, in accordance with a preferred embodiment of the present invention, processor 70 facilitates the transfer of the television or video signal from interface diplexer 58 to television 60. In addition, processor 70 preferably interfaces with modem 66, dictating to the modem how it should handle voice and computer data information. Finally, processor 70 preferably coordinates sending user request and message information received by receiver 68 back to service module 40 (via modem 66), and facilitates the display of channel and system message information on display 71. System message information may include billing information, as well as authorization or system messages from the headend or service provider via service module 40.

Figure 3:
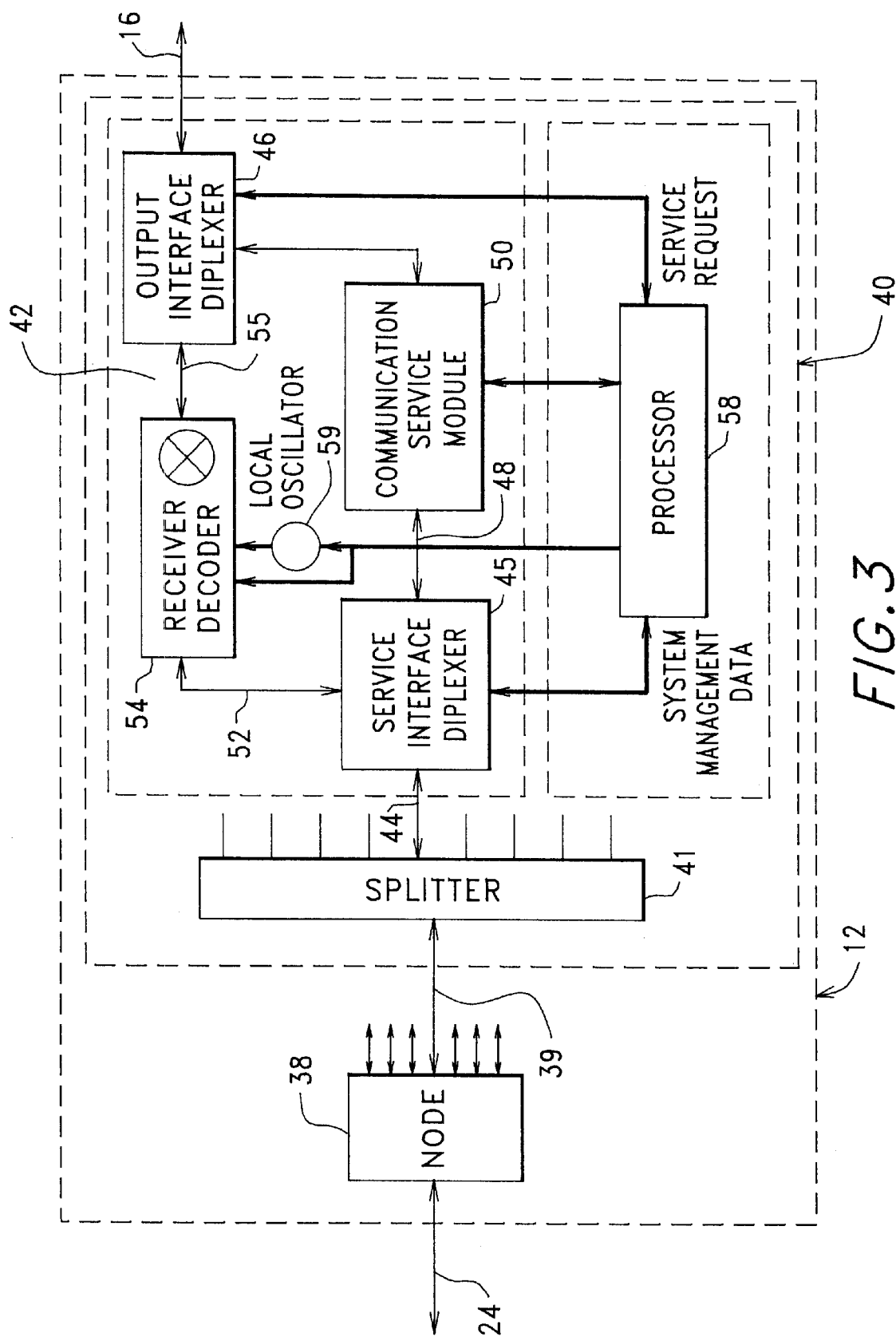
FIG. 3 is a schematic diagram of a service module forming a part of the telecommunications system embodying the present invention.

Referring now to FIG. 3, a more detailed illustration of distribution system 12, and in particular service module 40, is shown. As mentioned above, distribution system 12 preferably comprises one or more nodes 38 which connect to a plurality of service modules 40.

In accordance with a preferred embodiment of the present invention, service modules 40 preferably are configured to receive signals from headend system 11 and distribute them to authorized service requesting users at user sites 15 via CIB 14. Service modules 40 also preferably handle two-way telephone and computer traffic for each user. Each service module 40 is designed to serve a number of users simultaneously, such as between about 10 and about 50 users, and more preferably about 20 users.

The present invention is based on the premise that all video communications between service modules 40 and CIBs 14 occur over one or more channels of television bandwidth, typically one channel for each TV set having its own CIB 14. The channels are communicated either as baseband audio and video signal, or as a low frequency channel like 2, 3, 4, or 5. As a result of only one or a few channels being sent to each user site 15, signal stealing is reduced because only a few channels can be stolen at a time, and the party stealing the signal is limited to watching the channel(s) selected by the valid user. This premise, of course, presupposes that all cable connections and hardware devices between headend system 11 and service modules 40 are secure. Such security can be achieved by providing secure buildings and structures for all headend, node and service module equipment, as well as using sophisticated jamming algorithms and other forms of scrambling and encryption. One skilled in the art will appreciate that the video signal received and processed by service modules 40 may be analog or digitally compressed signals. Therefore, the type of signal (i.e., analog or digital) will dictate the type of scrambling, jamming and/or encryption techniques used.

Service module 40 preferably is an addressable or programmable module, which receives a scrambled, jammed, and/or frequency shifted signal having a plurality of channels modulated therein. Service module 40 then converts a user requested video channel from its modulated frequency in the signal to baseband or a low frequency channel and transmits it to the requesting user. Thus, in accordance with a preferred embodiment of the present invention, a significant amount of the intelligence and decision making aspects of the system are provided within service module 40, as shown schematically in FIG. 3. In particular, service module 40 preferably include a signal power splitter 41 which receive signals from and transmit signals to cable node 38 through a wide bandwidth communication line 39, such as a coaxial cable, fiber-optic cable, or the like. In addition, signal power splitter 41 preferably amplifies and distributes signals to individual user circuits 42 in service module 40, through splitter connections 44.

Individual user segments or circuits 42 of service module 40 preferably communicate with the individual CIBs 14 of each user. Each such user circuit 42 preferably comprise a service interface diplexer 45, an output interface diplexer 46, a communication service module 49, a receiver decoder 54, and a local oscillator 59. Service interface diplexer 45 of service module 40 preferably is configured to receive a communication signal from node 38 via splitter 41 and splitter connection 44. Service interface diplexer 45 in turn sends the signal to output interface diplexer 46 either through communication service module 49, which handles telephone and computer traffic for the user, or through receiver decoder 54, which handles the video signals.

In accordance with this part of the present invention, if the signal includes telephone or computer signals, service interface diplexer 45 preferably passes the telephone and/or computer components of the signal to communication service module 49 via connection 48. If the user is authorized to receive the telephone and/or computer signal(s), communication service module 49 then passes the signal to output interface diplexer 46 via connection 50. Thus, in essence, communication service module 49 acts as a communication switch allowing the telephone and/or computer signals to pass through if the user is authorized for such services. Otherwise, if the user is not authorized, communication service module 49 will prevent the communication.

The video portion of the signal, which may be analog, analog scrambled, or digitally compressed and encoded preferably is passed to receiver decoder 54 via connection 52. Upon receiving the video signal, receiver decoder 54 descrambles or decrypts the signal and converts the particular video channel requested by a user from its modulated or compressed waveform to either its baseband frequency or to a predetermined low frequency channel, such as channel 2, 3, 4 or 5. Once the selected video channel is converted to its baseband frequency or the low frequency channel, receiver decoder 54 then sends the single channel signal to output interface diplexer 46 via connection 55. As discussed in greater detail below, receiver decoder 54 preferably utilizes local oscillator 59 to convert the selected channel from its modulated frequency to the baseband frequency or low frequency channel output.

Once output interface diplexer 46 has received the video, voice and/or computer signals from receiver decoder 50 and communication service module 49, it in turn sends the signal through communication cable 16 to the subscriber or user set-top communication device 14. In addition, if subscriber premise or user site has more than one TV that is independently tuned (i.e., has its own CIB), service module 40 preferably will have one receiver decoder 54 per TV set. Each receiver decoder 54 will modulate each program requested from each TV to a different channel, say 2, 3, 4 or 5. The channels then will be combined together by the same output interface diplexer 46.

Service interface diplexer 45, output interface diplexer 46, receiver decoder 54, communication service module 49, and local oscillator 59 of each user circuit 42 preferably are controlled by a common processor 58. As one skilled in the art will appreciate, processor 58 may comprise any suitable computer processor and may further be configured with memory, storage and communication buses and interfaces, as necessary.

In accordance with a preferred embodiment of the present invention, processor 58 preferably controls all functions for each user of a particular service module 40. For example, processor 58 may be programmed or configured to maintain all billing information, perform routine checks to verify that the signal is not being stolen, handle user requests, control the allocation of system management data and subscriber messages, and download television and pay channel programming information to CIBs 14.

In accordance with a preferred embodiment of the present invention, processor 58 preferably provides control signals to the various components of service module 40 to control the operation of the service module and the system. For example, when a user sends a request for a particular video channel, this request preferably arrives at output interface diplexer 46 where it is recognized as a service request and sent to module control processor 58. The request message or code preferably includes the channel request, as well as various customer information, such as the customer's identification number, and secret code or password. In addition, processor 58 may be programmed to ask for additional identification information from the user if necessary.

Upon receipt of the channel request and customer information, processor 58 then verifies that the customer or user is a valid customer and also verifies that the customer is authorized to receive the requested channel. If the customer passes the authorization checks, processor 58 sends the appropriate tune signal to local oscillator 59 and the appropriate descrambling or decoding command to receiver decoder 54.

As one skilled in the art will appreciate, the video or television signal received by service module 40 from headend system 11 may be scrambled or encrypted in accordance with one or more scrambling techniques. For example, encryption, synchronization suppression, spectral inversion, jamming, or non-standard frequency modulation may be used. In addition, some of the channels modulated in the signal may be analog and others digital. Thus, receiver decoder 54 preferably is configured to decode or decrypt the signal and handle both analog and digital channels at the same time. Preferably processor 58 includes the descrambling or decoding intelligence and instructs receiver decoder 54 as to how to handle the decoding in accordance with the proper decoding scheme.

After receiver decoder 54 decodes the signal, local oscillator 59 then converts the decoded channel output of receiver decoder 54 into channel 2, 3, 4, or 5, as desired. That is, once the video signal has been decoded, local oscillator 59 preferably converts the selected channel from its modulated frequency to the desired television channel frequency, usually baseband frequency or channel 2, 3, 4 or 5. The video channel then is sent to CIB 14 via output interface diplexer 46.

During the authorization process, if the customer is an invalid or unauthorized customer, processor 58 preferably sends an alarm to headend system 11 through the system management data bus to inform the headend system that an invalid customer is on the port. Processor 58 also then turns off the local oscillator synthesizer 59 for that particular user port 42, in effect disabling the port until the headend system solves the illegitimate request problem. Once the problem is rectified, headend system 11 can reactivate the port, either locally or remotely from the headend system.

In accordance with a further aspect of the present invention, if a customer or user requests a channel which he is not authorized to receive, processor 58 preferably will send a system message to the CIB 14 for that customer, informing the customer that he requested an invalid or unauthorized channel. Preferably, the message will be displayed on display 71 of CIB 14 (See FIG. 2).

In accordance with yet another aspect of the present invention, if the customer requests a pay-per-view or video on demand movie or feature, processor 58 checks to see if the customer has sufficient credit for that purpose. This can be done in several ways. For example, processor 58 may check a credit report for the customer or the customer's payment history. If the customer has a sufficient credit rating or an adequate payment history, processor 58 will allow the request and bill the customer; otherwise, processor 58 will reject the request and send a message to the user stating the reason for rejection. In addition, the system may be set-up so that the customer must pre-pay for any pay channel requests. In this manner, the customer preferably has an account with payment credits in it. If the customer has enough available credits, processor 58 will allow the pay channel request and debit the customer's credit account; otherwise, processor 58 will reject the request and send a message to the customer stating the reason.

As with the other video channels, if the pay channel request is allowed, processor 58 will direct receiver decoder 54 to select the pay channel from the video signal stream, and local oscillator 59 will convert the pay channel from its modulated frequency to the appropriate frequency for transmission to the customer communication interface box 14 (e.g., baseband or channels 2, 3, 4, 5 or the like.

In accordance with still a further aspect of the present invention, processor 58 also desirably may include parental control and other filtering capabilities. For example, processor 58 can be programmed to exclude children from receiving certain selected video channels.

In accordance with yet another preferred aspect of the present invention, if customer interface box 14 or the user's television set is switched off, processor 58 preferably receives this information via connection 16 and output interface diplexer 46 and shuts off the signal to CIB 14. This effectively protects the system from someone tapping into the cable and watching a video channel when the legitimate subscriber is not watching.

When a user or customer attempts to make a phone call, CIB 14 preferably formats the return path of the signal with a telephone request message and the phone number to be accessed. Processor 58 then receives the phone request and checks whether the user is authorized to receive the telephone service. If so, processor 58 sends a command to the communication service module 49 to connect the customer's telephone connection to the headend system 11 or directly to a telephone public branch exchange (PBX) or long distance carrier via a suitable communication connection, such as a fiber optic cable, coaxial cable, twisted pair phone line, or a satellite or cellular connection. As mentioned above, if the telephone call is connected to headend system 11, preferably the telephone call is communicated to the headend system via the return path of connection 39 to node 38, and from node 38 via connection 24 to the headend system.

In a similar manner, if a user requests computational or internet access services, processor 58 receives the service request and user information from CIB 14 via the return path of communication connection 16. Again, processor 58 verifies that the customer is authorized for such services and then, if authorized, instructs communication service module 49 to connect communication device 14, and in particular, computer 64 to the return path back to the computer or internet access line 22 of the headend system.

In accordance with a preferred embodiment of the present invention, the service interface diplexers 45 for each user circuit 42 in service module 40 preferably are configured to separate forward and reverse signals to and from headend system 11. Signals from headend system 11 typically comprise various encrypted television broadcast, cable and pay channels which can be in analog form, digitally compressed form, or a combination of both. Signals from headend system 11 also may include forward path data for the customers computer and/or telephone communications, as well as global and/or individual messages or instructions to the various service modules or individual subscribers. These forward path signals typically are modulated to frequencies above 50 MHz.

Reverse or return path signals from the service modules to the headend system typically comprise telephone and computer communications from the users, as well as customer service requests, pay-per-view program requests and system management data, such as repair, maintenance and status information messages from the users or the service modules. In accordance with a preferred embodiment of the present invention, return path signals typically are communicated at frequencies below 40 MHz, and more specifically between about 4 MHz and about 35 MHz. In accordance with this aspect of the invention, service interface diplexers 45 preferably have a 50 MHz high pass filter in the forward path and a 50 MHz low pass filter in the return path, thus separating the forward and return paths of the signals. In addition, service interface diplexers 45 may be configured to create or format the return path signal by combining the outgoing telephone and/or computer communications signals, and the system management data into a block of return path data, and ensuring the return path information or data is formatted or modulated to the appropriate return path frequencies.

However, while in accordance with the described embodiment of the present invention, service interface diplexers 45 are configured to format the return path to headend system 11, one skilled in the art will appreciate that other modules or components of service module 40 may be configured to format the return path data. For example, processor 58 and/or receiver decoder 54 may be used to combine and format the return path data. Thus, the present invention is not limited to the described embodiment.

Output interface diplexers 46 essentially are similar to service interface diplexers 45 and preferably comprise similar low pass and high pass filters. As discussed above, when a customer requests a particular video or television channel, processor 58 directs receiver decoder 54 (and local oscillator 59) to convert the video channel from its modulated frequency decrypt of descramble the signal, and then transmit the signal at baseband to the signal's baseband frequency or a low channel frequency, preferably channel 2, 3,4 or 5. Thus the video portion of the forward path signal from service module 40 to the user site preferably comprises only one channel for each customer interface box 14. In addition, the telephone and computer information portions of the forward path signal to CIB 14 may be carried in the vertical blanking interval (VBI) of one or more forward path channels, or the telephone and computer information may be formatted into one or more forward path channels.

In accordance with a further aspect of the present invention, if a user site has more than one television, that user site typically will have more than one CIB 14; preferably one for each television set. Since the user site typically will only have one communication connection to a service module 40, in order for each television set to display a different video signal than the other television sets at the user site, multiple video channels should be transmitted to the user site. Preferably one channel for each television set and associated CIB 14 is transmitted to the user site via communication connection 16. Thus, to accommodate such a configuration, each such CIB 14 associated with each television set preferably is tuned to a different channel, for example 2,3,4,5, etc., and the forward path signal to the user site will include a multiple channel signal, one channel for each device.

The return path from each CIB 14 to the service modules 40 carries data from the a user's computer, outgoing voice or telephone signals, and the service requests of the user. In the event a customer's computer is configured to receive information at baseband, a separate connection from service module 40 to the user site can be provided for carrying the separate baseband output from service module 40 to the computer. Preferably such connection is a separate cable connection so as not to interfere with other data and television signals between the user site and the service module.

The main function of communication service module 49 as shown in FIG. 3 is to handle all voice and data communication according to the needs of the user. As mentioned above, the user's CIB 14 preferably contains a modem so that data is presented to service module 40 in a digitized format. Thus, if processor 58 authorizes a telephone and/or computer service request, communication service module 49 preferably acts as a switch, allowing the telephone and/or computer communication to transfer to service interface diplexer 45, and ultimately to the headend system.

As mentioned above, computer and telephone information may be carried in the forward path from service module 40 to CIB 14 in a high frequency dedicated channel, in the 4–40 MHz band, or the information can be encoded in the vertical blanking interval (VBI) of one or more video channels. In accordance with this aspect of the invention, communication service module 49 will only handle the return path telephone and computer information from CIB 14, while the forward path telephone and computer information will pass through receiver decoder 54. In accordance with another embodiment of the present invention, communication between service module 40 and the user modem 66 of CIB 14 may be on a separate dedicated two-way communication line. In this case, communication module 49 will handle both forward and return data.

Figure 4:
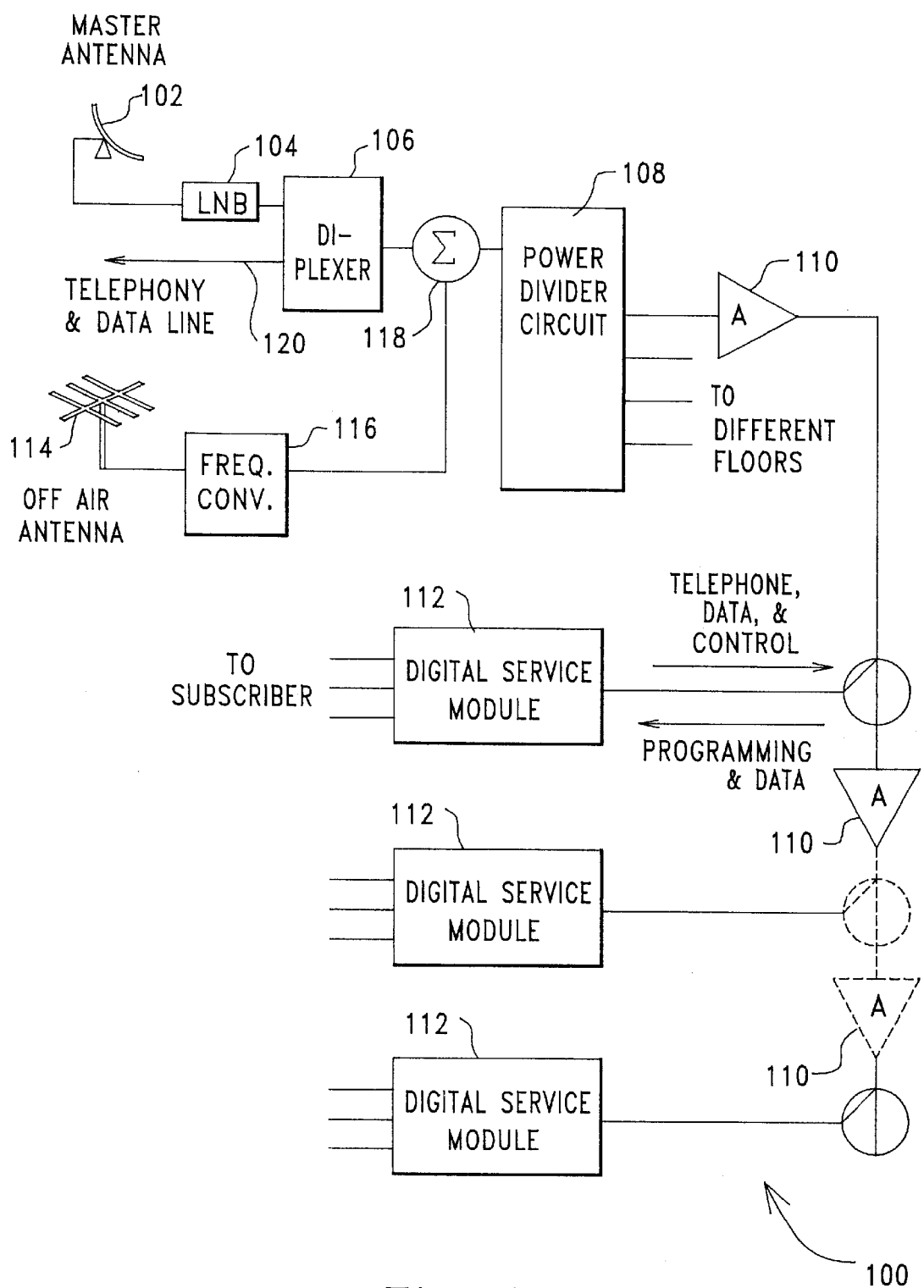
FIG. 4 is a schematic diagram of a signal distribution system forming a part of the telecommunications system embodying the present invention and designed for apartment or multiple dwelling unit use.

Referring now to FIG. 4, another embodiment of the present invention is shown. In accordance with this particular embodiment, a telecommunication system 100 is configured to deliver a variety of telecommunication services to customers or users residing in multiple dwelling units (MDUs), such as apartment houses, town homes, office buildings, campuses, and the like.

As one skilled in the art will appreciate, delivering direct-to-home satellite transmission to residents in MDU complexes is difficult because it is difficult or impossible to add individual satellite antennas for each unit. Thus, to overcome this problem, some MDU complexes place a single antenna or a group of antennas on the roof or other location on the MDU complex and transmit the signal to the individual resident homes. The problem with these systems is that they require separate, expensive receiver decoders for each resident unit, increasing the cost of the system, and thus making it difficult to compete with traditional cable television systems. In addition, the current systems have no means for providing additional telephone and computer access services. Therefore, it is desirable to have a system which can provide satellite TV, local TV, telephone and computer services to customers in MDU complexes at a reasonable expense.

The telecommunication system 100, illustrated in FIG. 4 preferably is configured to provide such services. In particular, telecommunication system 100 preferably comprises one or more master antennas 102, a low noise block (LNB) converter 104, a diplexer 106, a power divider circuit 108, a plurality of signal amplifiers 110, and one or more service modules 112.

In accordance with a preferred embodiment of the present invention, master antenna 102 is configured to receive a variety of television programming channels from a video satellite service provider. The video channels may comprise a variety of cable channels, as well as pay-per-view and video on demand services. Preferably, the video signal received by antenna 102 is a 500 MHz signal in the Ku frequency band. LNB converter 104, preferably receives the signal and converts it to the L band frequency range, approximately 950 to 1450 MHz. This 500 MHz signal spectrum preferably is divided into about 10 to about 20 transponder slots, each of which may carry an analog video channel 10 or more digitally compressed video channels. Each transponder slot comprise a frequency band of between about 25 MHz to about 50 MHz, and more preferably about 36 MHz.

From LNB converter 104, the analog and/or digitally compressed video signal passes to diplexer 106, which as discussed in greater detail above, separates the downstream signals from the return path signals. From diplexer 106, the signal passes through power divider circuit 108, which divides and amplifies the signal into a plurality of signals, preferably one signal for each floor, townhome group etc. The output from each individual divided line then is transmitted to one or more service modules 112 for the particular floor or group. As one skilled in the art will appreciate., as the signals are transmitted to the various service modules 112 on the various floors or home groups, it may be desirable to amplify the signals as they are transmitted. Thus, as illustrated in FIG. 4, the signals may pass through one or more signal amplifiers 110. The number and location of signal amplifiers 110 will depend on the particular configuration of the MDU.

In accordance with another embodiment of the present invention, the signal from antenna 102 and LNB 104 is converted to an optical signal using an electrical to optical converter (not shown) and sent over a fiber-optic cable to the service modules 112 on the various floors or at other relatively secure locations. The service modules 112 then preferably are configured to convert the optical signal back to electrical and then process the signal accordingly.

Service modules 112 preferably are configured to receive the video signals in analog form, digitally compressed form, or both. If the signal is digitally compressed, service modules 112 preferably converts the preferred transponder slot carrying the requested channel from its modulated frequency to baseband, decompresses the signals into the various video channels decrypts the signal if encryption is used, and then transmits the requested video channels to the individual users.

In accordance with the illustrated embodiment, service modules 112 are similar to the service modules discussed above with reference to FIG. 3. In addition, if handling digitally compressed signals, service modules 112 preferably include circuitry to decompress digitally compressed video signals. In accordance with this aspect of the invention, service modules 112 preferably comprise about 10 to about 20 integrated receiver decoders (IRDs) (one for each user connected to service module 112). The IRDs preferably extract the transponder frequency band from the compressed video signal which includes the requested channel for the particular user and converts it to baseband frequency. The IRD then decompress the frequency band into the 10 to 20 individual channels that were digitally compressed into that band. If the signal was sent encrypted, the IRD will decrypt the signal. Then, using the IRD and perhaps a local oscillator, service module 112 extracts the requested video channel and transmits it to the user at baseband, or converts it to a channel frequency, such as channel 2, 3, 4 or 5 and then transmits it to the user requesting the channel.

In accordance with another embodiment of the present invention, system 100 may further comprise an antenna 114 for receiving local broadcast television signals. In accordance with this aspect of the present invention, the signal from antenna 114 preferably passes to a frequency converter 116, which converts the received local broadcast signals to desirable frequencies and then passes the signals to a summing circuit 118. Summing circuit 118 preferably combines the local broadcast signals with the signals received from the satellite antenna 102 and passes the signals to power divider 108. In this manner, system 100 can provide both satellite channels and local broadcast channels to the users, a solution which most satellite service providers cannot currently provide, even to stand alone homes.

System 100 also can be configured to provide telephone and computer services to the customers residing in the MDU complexes. As with the system illustrated in FIG. 1 and described above, customer service requests, as well as telephone and computer access preferably originate from a customer communication device located at the user site. From the customer communication device, the service requests and telephone and computer signals are communicated to service modules 112. Service modules 112 process the service requests and forward the telephone and computer signals on to a telephone system and/or a computer or internet access facility, respectively. In accordance with this aspect of the invention, the telephone and computer signals from service modules 112 preferably pass back through diplexer 106, which separates the forward and return path signals. The return path signals (i.e., telephone and computer signals) then are connected from diplexer 106 to the appropriate locations via a suitable connection 120, such as a phone line, cable line, cellular connection, or the like. For example, a telephone call may be connected to a local PBX, or the telephone call may be connected directly to a long distance carrier. Similarly, the computer signals may be connected to one or more internet or computer network access services.

Figure 5:
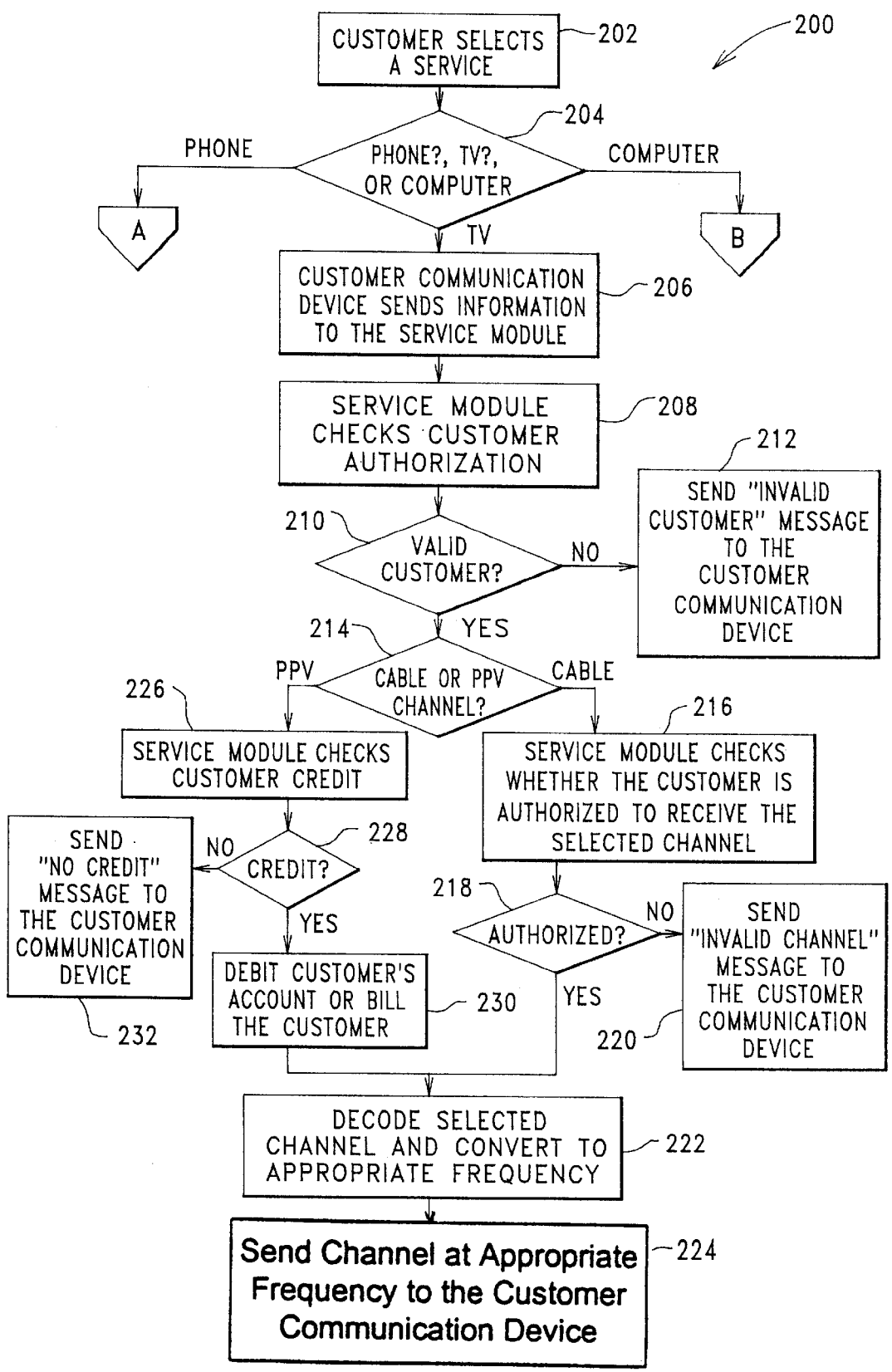
FIG. 5 is a flow diagram illustrating a method of using the telecommunications circuit or system embodying the present invention.
Figure 6:
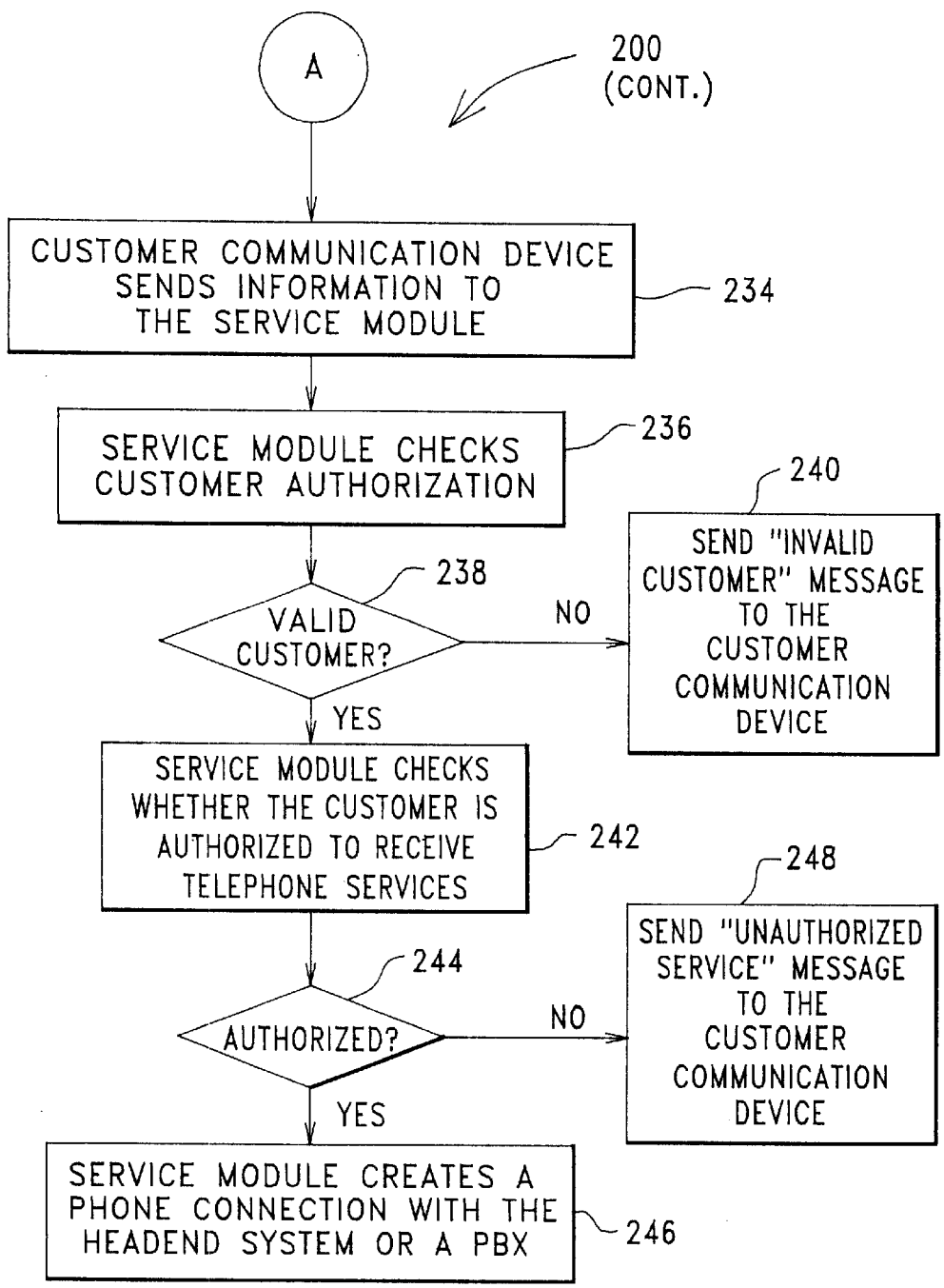
FIG. 6 is a flow diagram illustrating a method for customer telephone communication with the telecommunications system embodying the present invention.
Figure 7:
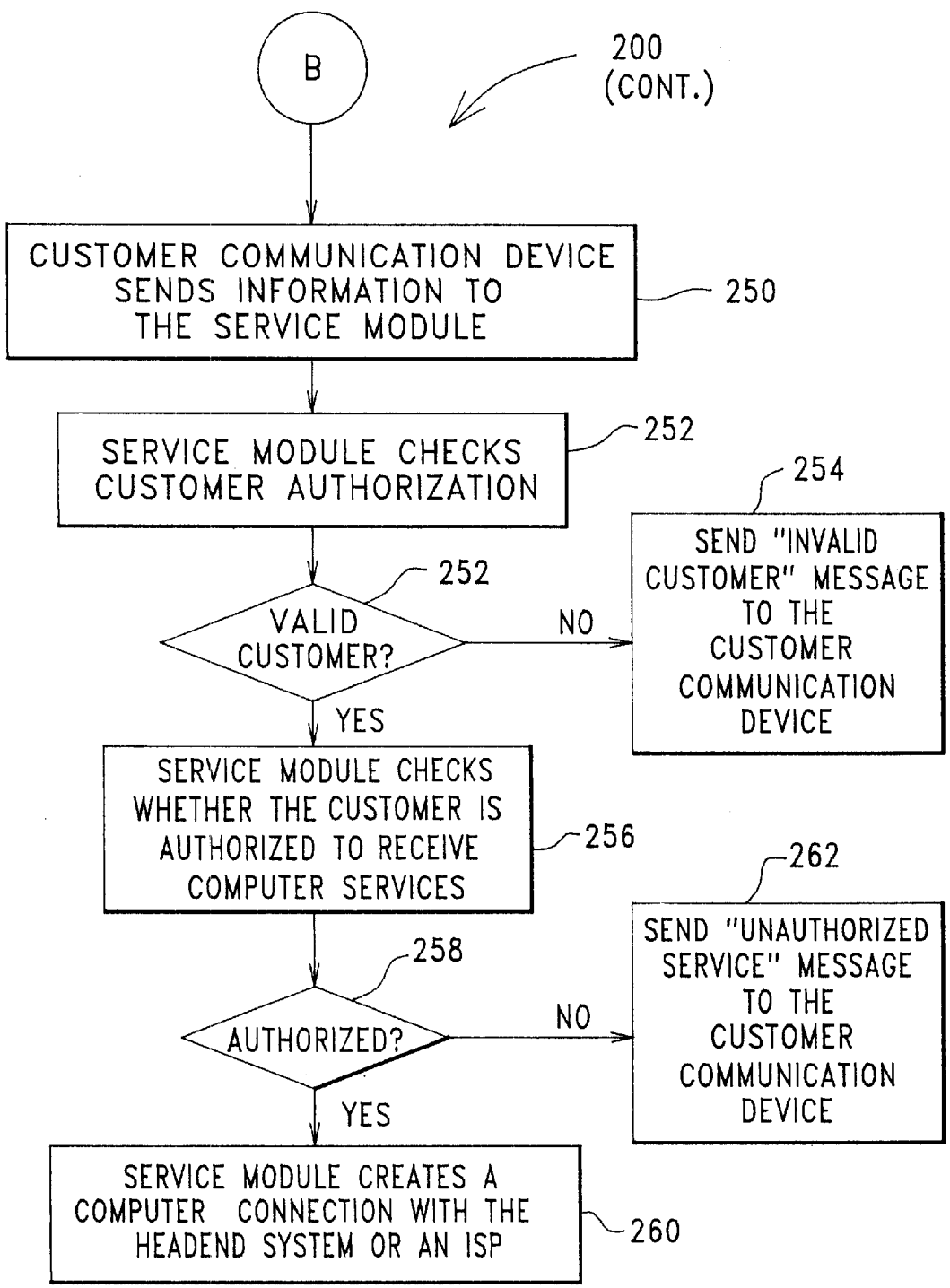
FIG. 7 is a flow diagram illustrating a method of customer data or computer communication with a telecommunications system embodying the present invention.

As described above, the present invention provides for a simple, efficient method for a user or subscriber to select a desired service, and for a system to determine if customer or user is valid for that service, and, if so, supply the selected service. Referring now to FIGS. 5, 6 and 7, a flow chart 200 of a method for providing telecommunication services to customers or users is illustrated. In accordance with a preferred method, the customer or user preferably. chooses a telecommunication service, such as video, telephone, or computer services. The flow process for telephone services is shown in FIG. 6, while the flow process for computer services is shown in FIG. 7.

Referring now to FIG. 5, the method for providing video services will be discussed. In particular, when a customer selects a video channel for viewing (step 202), the customer communication device or set-top box determines that a video service was requested (step 204) and preferably communicates the selected channel and other user information to the service module (step 206). The service module receives the request and the service module's processor then checks the customer authorization (step 208) and determines whether or not the customer is a valid user (step 210). If not, the service module sends an invalid customer message to the customer communication device and refuses service (step 212). If the customer has a valid account, the cable or paid television channel is selected and processed accordingly (step 214). If a cable channel is selected, the service module checks to determine whether or not the customer is authorized to receive the selected channel (step 216 and 218). If not, an invalid channel message is sent to the customer (step 220). If the customer is authorized to receive the selected cable channel, the signal is decoded and converted to the proper frequency (step 222). Once converted, the signal is sent to the requesting user (step 224).

If a pay-per-view selection is selected by the customer, the service module checks the customer's credit (steps 226 and 228) and, if valid, charges the customer's account or bills the customer (step 230). The service module then decodes the selected channel (step 222), and sends it at the appropriate frequency to the customer's communication device (step 224). If credit is refused, the customer is so advised (step 232).

Telephone and computer selections are handled similarly, as shown in FIGS. 6 and 7. If the customer selects telephone services (FIG. 6), the customer communication device sends a telephone request and the requested telephone number to the service module (step 234). The service module checks the customer authorization (step 236) and determines whether or not the requester is an authorized customer (step 238). If not, the service module sends an invalid customer message to the requesting customer communication device (step 240). If the customer is a valid customer, the service module creates a phone connection between the customer's phone and the headend system, a PBX or a long distance carrier (step 246). Otherwise, the service module sends an unauthorized service message to the requesting customer communication device (step 248).

Likewise, if the customer selects computer communication (FIG. 7), that information is sent by the customer interface to the service module (step 250), wherein the service module again checks customer service authorization (steps 252–258), and, if authorized, the customer receives the desired computer service and the service module creates a computer connection with the headend system or an Internet service provider (step 260). Otherwise, exception messages are sent to the user (steps 254 and 262).

If there is an incoming telephone call to the customer, the service module preferably verifies that this is a valid customer with telephone services, makes a diplexer connection to the customer's set-top interface, sends the call through to the customer, and the customers telephone rings. Telephone services offered by the telephone provider can be passed to the customer in the usual manner for use in the usual way.

In conclusion, the present invention provides a novel telecommunication system for providing a plurality of telecommunication services to plurality of customers in a secure, inexpensive manner. While a detailed description of presently preferred embodiments of the invention have been given above, various alternatives, modifications, and equivalents will be apparent to those skilled in the art. For example, while different components or circuits of the service module of the present invention are described herein as performing certain specific functions, one skilled in the art will appreciate that other components or circuits in the service module may perform some or all of the service module functions without varying from the spirit of the invention. Therefore, the above description should not be taken as limiting the scope of the invention which is defined by the appended claims.

What is claimed is:

1. A telecommunication system for providing telecommunication services to customers, comprising:

a headend system which provides said telecommunication services in the form of telecommunication signals;

one or more service modules in communication with said headend system and configured to receive said telecommunication signals from said headend system and provide selected ones of said telecommunication signals from said headend system to said customers;

a customer interface device for each of said customers, said customer interface device in communication with one of said one or more service modules;

wherein each of said one or more service modules includes an individual user circuit for each customer interface device in communication with said service module;

wherein each individual user circuit receives all of said telecommunication signals from said headend system and selects the selected ones of said telecommunication signals that are provided to said customer interface device associated with said customer; and wherein to obtain telecommunication services from said telecommunication system a customer issues one or more service requests to said service module for one or more of said telecommunications services using said customer interface device associated with said customer;

said service module receives said one or more service requests from said customer interface device via said individual user device and determines whether said customer is authorized to receive die requested one or more telecommunication services;

if said customer is authorized to receive the requested one or more of said telecommunications services, said service module obtains a telecommunication signal associated with the requested one or more of said telecommunication services from said headend system and provides said telecommunication signal associated with the requested one or more of said telecommunication services to said customer interface device associated with said customer.

2. A telecommunication system as recited in claim 1, wherein said service module includes processing means for determining whether said customer is authorized to receive the requested one or more of said telecommunication services by checking whether said customer is a valid customer.

3. The telecommunication system as recited in claim 1, wherein said service module includes processing means for determines whether said customer is authorized to receive the requested one or more of said telecommunication service by checking whether said customer has obtained rights to use the requested one of said telecommunication service.

4. The telecommunication system as recited in claim 1, wherein said telecommunication signals from said headend system can be in analog form, digital form, or a combination of analog and digital form.

5. A telecommunication system for providing telecommunication services to customers, comprising:

a headend system which provides said telecommunication services in the form of telecommunication signals;

a service module in communication with said headend system and configured to receive said telecommunication signals from said headend system and provide said telecommunications signals from said headend system to said customers; and a customer interface device for each of said customers, said customer interface device in communication with said service module;

wherein said service module has a plurality of individual user circuits, there being a separate individual user circuit for each customer interface device in communication with said service module, and further wherein each individual user circuit has an integrated receiver/decoder therein;

wherein to obtain telecommunication services from said telecommunication system;

a customer issues one or more service requests to said service module for one or more of said telecommunication services using said customer interface device associated with said customer;

said service module receives said one or more service requests from said customer interface device and determines whether said customer is authorized to receive the requested one or more of said telecommunication services;

if said customer is authorized to receive the requested one or more of said telecommunication services, said service module obtains a telecommunication signal associated with the requested one or more of said telecommunication services from said headend system and provides said telecommunication signal associated with the requested one or more of said telecommunication services to said customer interface device associated with said customer;

wherein one of the requested telecommunication services comprises video services, and said service request from said customer comprises a request for a video channel from a plurality of video channels, each of said plurality of video channels being modulated to a different frequency and combined as a single video signal by said headend system and transmitted from said headend system to said service module, and wherein upon said service module receiving said service request for said video channel from said customer:
  if said customer is authorized to receive said video channel requested by said customer, the integrated receiver/decoder in said service module extracts said video channel requested by said customer from said video signal and converts said video channel from its modulated frequency to a baseband frequency, said service module then transmits said video channel at said baseband frequency to said customer interface device associated with said customer; and
  said customer interface device associated with said customer receives said video channel at said baseband frequency and communicates said video channel to a viewing apparatus for viewing.

6. The telecommunication system as recited in claim 5, wherein said service module further comprises output means for receiving said video channel from said receiver/decoder and transmitting said video channel to said customer interface device.

7. A telecommunication system for providing telecommunication services to customers, comprising:
  a headend system which provides said telecommunication services in the form of telecommunication signals;
  a service module in communication with said headend system and configured to receive said telecommunication signals from said headend system and provide said telecommunications signals from said headend system to said customers; and
  a customer interface device for each of said customers, said customer interface device in communication with said service module;
  wherein said service module has a plurality of individual user circuits, there being a separate individual user circuit for each customer interface device in communication with said service module, and further wherein each individual user circuit has an integrated receiver/decoder therein;
  wherein to obtain telecommunication services from said telecommunication system;
    a customer issues one or more service requests to said service module for one or more of said telecommunication services using said customer interface device associated with said customer;
    said service module receives said one or more service requests from said customer interface device and determines whether said customer is authorized to receive the requested one or more of said telecommunication services;
    if said customer is authorized to receive the requested one or more of said telecommunication services, said service module obtains a telecommunication signal associated with the requested one or more of said telecommunication services from said headend system and provides said telecommunication signal associated with the requested one or more of said telecommunication services to said customer interface device associated with said customer;
    wherein one of the requested telecommunication services comprises video services, and said service request from said customer comprises a request for a video channel from a plurality of video channels, each of said plurality of video channels being modulated to a different frequency and combined as a single video signal by said headend system and transmitted from said headed system to said service module, and wherein upon said service module receiving said service request for said video channel from said customer;
    if said customer is authorized to receive said video channel requested by said customer, the integrated receiver/decoder in said individual user circuit of said service module extracts said video channel requested by said customer from said video signal and converts said video channel from its modulated frequency to a predetermined frequency, said service module then transmits said video channel at said predetermined frequency to said customer interface device associated with said customer; and
    said customer interface device associated with said customer receives said video channel at said predetermined frequency and communicates said video channel to a viewing apparatus for viewing.

8. The telecommunication system as recited in claim 7, wherein said predetermined frequency comprises a frequency associated with a single television channel on a television.

9. The telecommunication system as recited in claim 5, wherein said plurality of video channels in said video signal comprise analog video channels, and wherein said receiver/decoder comprises an analog receiver/decoder.

10. The telecommunication system as recited in claim 9, wherein said analog video channels are scrambled before being transmitted from said headend system to said service module, and wherein said service module includes descrambling means for descrambling the scrambled analog video channels.

11. The telecommunication system as recited in claim 10, wherein said analog video channels are scrambled using a scrambling technique selected from a group of scrambling techniques including synchronization suppression, spectral inversion, signal jamming, and non-standard frequency modulation.

12. The telecommunication system as recited in claim 5, wherein said plurality of video channels in said video signal comprise digitally compressed video channels, and wherein said receiver/decoder comprises a digital receiver/decoder.

13. The telecommunication system as recited in claim 12, wherein said digitally compressed video channels are encrypted before being transmitted from said headend system to said service module, and wherein said service module includes decryption means for decrypting the encrypted digitally compressed video channels.

14. The telecommunication system as recited in claim 5, wherein said plurality of video channels in said video signal comprise a combination of analog video channels and digitally compressed video channels, and wherein said receiver/decoder is configured to receive and process both analog video channels and digitally compressed video channels.

15. The telecommunication system as recited in claim 14, wherein said analog video channels are scrambled before being transmitted from said headend system to said service module and said digitally compressed video channels are encrypted before being transmitted from said headend to said service module, and wherein said service module includes descrambling means for descrambling the scrambled analog video channels and decryption means for decrypting the encrypted digitally compressed video channels.

16. The telecommunication system as recited in claim 5, wherein one or more of said plurality of video channels comprise pay-per-view television channels, and said service request from said customer comprises a request to purchase a pay channel program on one of said pay-per-view television channels, and wherein if said customer is authorized to receive said pay channel program, said service module transmits said pay-per-view television channel carrying said pay channel program to said customer interface device associated with said customer and charges said customer for the cost of said pay channel program.

17. The telecommunication system as recited in claim 16, wherein said service module determines whether said customer is authorized to receive said pay channel program by checking whether said customer has enough available credit to purchase said pay channel program.

18. The telecommunication system as recited in claim 1, wherein one of said requested telecommunication services comprises an outgoing telephone call from said customer and said service request from said customer comprises a request to connect said telephone call from said customer to another party having telephone services, and wherein upon said service module receiving said service request for said outgoing telephone call from said customer, said service module connects said customer telephone call to a telephone service provider, which in turn, connects said telephone call to said another party.

19. The telecommunication system as recited in claim 1, wherein one of said requested telecommunication services comprises an outgoing telephone call from said customer and said service request from said customer comprises a request to connect said telephone call from said customer to another party having telephone services, and wherein upon said service module receiving said service request for said outgoing telephone call from said customer, said service module connects said customer telephone call to said headend system which, in turn, connects said customer telephone call to a telephone service provider, which in turn, connects said telephone call to said another party.

20. The telecommunication system as recited in claim 1, wherein said requested one of said telecommunication services comprises computer network connectivity services and said service request from said customer comprises a request to connect a computer to a network, and wherein upon said service module receiving said service request from said customer, said service module creates a data connection between a computer connected to said customer interface device and a network connectivity service provider.

21. The telecommunication system as recited in claim 1, wherein said requested one of said telecommunication services comprises computer network connectivity services and said service request from said customer comprises a request to connect a computer to a network, and wherein upon said service module receiving said service request from said customer, said service module creates a data connection between a computer connected to said customer interface device and said headend system.

22. The telecommunication system as recited in claim 1, wherein one of said telecommunication services comprises incoming telephone services, and wherein when a third party calls a user connected to said telecommunication system, said third party call is connected to a service module associated with said user, said service module then checks to determine if said user is authorized to receive telephone calls, if said user is authorized, said service module connects said third party call to a customer interface device associated with said user which, in turn, connects said third party call to a telephone device.

23. A system for providing video services to users in a shared antenna complex, comprising:
   video channel converting means for receiving video channels from at least one video channel provider and from at least one shared antenna and creating a in multiplexed channel signal by modulating selected ones of said video channels to different frequencies and combining said video channels modulated to different frequencies together with other ones of said video channels into said multiplexed channel signal;
   a service module in communication with said video channel converting means and adapted to provide said video services to a group of users in said shared antenna complex, said service module comprising:
      splitting means for receiving said multiplexed channel signal from said video channel converting means and splitting said multiplexed channel signal into a plurality of multiplexed channel signals, one for each of said users of said group of users;
      processing means for processing channel request from said users;
      a plurality of channel formatting means, there being a separate one for each of said users, each of said channel formatting means adapted to receive one of said plurality of multiplexed channel signals, extract a video channel from said one of said plurality of multiplexed video channels, said video channel being requested by one of said users, and transmit said video channel to a customer interface device associated with said one of said users, said customer interface device, in turn, transmitting said video channel to a video channel viewing apparatus.

24. The system as recited in claim 23, wherein said customer interface device communicates a user's video channel request to said processing means of said service module, and wherein said processing means checks whether said user is authorized to receive said requested video channel, and if said user is authorized, said processing means instructs one of said channel formatting means to extract and transmit said requested video channel to said customer interface device.

25. The system as recited in claim 24, wherein said processing means checks whether said user is authorized by checking whether said user is a valid user.

26. The system as recited in claim 24, wherein said processing means checks whether said user is authorized by checking whether said user has obtained rights to use the requested one of said telecommunication services.

27. The system as recited in claim 24, wherein one or more of said video channels comprise pay-per-view video channels, and wherein if a user's video channel request is for one of said pay-per-view video channels, said processing means checks whether said user is authorized to receive said pay-per-view video channel, and if said user is authorized, said processing means instructs one of said channel formatting means to extract and transmit said requested pay-per-view video channel to said customer interface device.

28. The system as recited in claim 27, wherein said processing means determines whether said user is authorized to receive said pay-per-view channel by checking whether said user has enough available credit to purchase said pay-per-view channel.

29. The system as recited in claim 23, wherein channel formatting means further comprises decoder means for extracting said requested video channel from said multiplexed channel signal and demodulating said video channel from its modulated frequency to baseband.

30. The system as recited in claim 29, wherein after said decoder means demodulates said requested video channel to baseband, said decoder means then remodulates said requested video channel to a predetermined frequency, and said channel formatting means transmits said video channel at said predetermined frequency to said customer interface device.

31. The system as recited in claim 30, wherein said predetermined frequency comprises a frequency associated with a single television channel on a television.

32. The system as recited in claim 29, wherein said video channels in said multiplexed channel signal comprise analog video channels, and wherein said decoder means comprises an analog receiver decoder.

33. The system as recited in claim 32, wherein said analog video channels are scrambled before being transmitted to said service module, and wherein said service module includes descrambling means for descrambling the scrambled analog video channels.

34. The system as recited in claim 33, wherein said analog video channels are scrambled using a scrambling technique selected from a group of scrambling techniques including synchronization suppression, spectral inversion, signal jamming, and non-standard frequency modulation.

35. The system as recited in claim 29, wherein said video channels in said multiplexed channel signal comprise digitally compressed video channels, and wherein said decoder means comprises a digital receiver/decoder.

36. The system as recited in claim 35, wherein said digitally compressed video channels are encrypted before being transmitted to said service module, and wherein said service module includes decryption means for decrypting the encrypted digitally compressed video channels.

37. The system as recited in claim 29, wherein said video channels in said multiplexed channel signal comprise a combination of analog video channels and digitally compressed video channels, and wherein said decoder means is configured to receive and process both analog video channels and digitally compressed video channels.

38. The system as recited in claim 37, wherein said analog video channels are scrambled before being transmitted to said service module and said digitally compressed video channels are encrypted before being transmitted to said service module, and wherein said service module includes descrambling means for descrambling the scrambled analog video channels and decryption means for decrypting the encrypted digitally compressed video channels.

39. The system as recited in claim 23, wherein said multiplexed channel signal from said video channel converting means carries analog video channels, digitally compressed video channels, or a combination of both analog and digitally compressed video channels.

40. The system as recited in claim 23, further configured to provide telephony services to said users, said service module further comprising telephony interface means for connecting telephone calls between a telephony service provider and a telephone connected to a customer interface device at a user's site, wherein when a service request from a user comprises a request to connect a telephone call from said user to another party having telephone services or when a telephone call directed to said user is connected to said service module from said telephony service provider, said processing means checks to determine whether said user is authorized for telephony services, and if said user is authorized for telephony services, said telephony interface means of said service module connects said telephone call between said telephony service provider, and said user.

41. The system as recited in claim 23 further configured to provide computer network connectivity services to said users, said service module further comprising computer network interface means for connecting a computer connected to a customer interface device at a user site to a computer network, wherein when a service request from a user comprises a request to connect said computer at said user site to said computer network, said processing means checks to determine whether said user is authorized for computer network connectivity services, and if said user is authorized for said services, said computer network interface means of said service module provides a data connection between said network and said computer connected to said customer interface box.

42. A system for providing telecommunication services, including video, telephony and computer network services to users, said system comprising:
    a headend system which provides said telecommunication services in the form of telecommunication signals included in a multiplexed channel signal;
    a service module in communication with said headend system and adapted to receive said telecommunication signals from said headend system and provide said telecommunication signals from said headend system to said users, said service module comprising:
        processing means for processing telecommunication service requests from said users;
        splitting means for receiving said multiplexed channel signal from said headend system and splitting said multiplexed channel signal into a plurality of multiplexed channel signals, one for each of said users of said group of users;
        a plurality of channel formatting means, there being a separate one for each of said users, each of said channel formatting means adapted to receive one of said plurality of multiplexed channel signals, extract a video channel from said one of said plurality of multiplexed channel signals, said video channel being requested by one of said users, and transmit said video channel to a customer interface device associated with said one of said users, said customer interface device, in turn, transmitting said video channel to a video channel viewing apparatus.

43. The system as recited in claim 42, wherein said telecommunication signals from said headend system carries analog signals, digital signals, digitally compressed signals, or any combination of analog, digital, and digitally compressed signals.

44. The system as recited in claim 42, wherein channel formatting means further comprises decoder means for extracting said requested video channel from said multiplexed channel signal and demodulating said video channel from its modulated frequency to baseband.

45. The system as recited in claim 44, wherein after said decoder means demodulates said requested video channel to baseband, said decoder means then remodulates said requested video channel to a predetermined frequency, and said channel formatting means transmits said video channel at said predetermined frequency to said customer interface device.

46. The system as recited in claim 45, wherein said predetermined frequency comprises a frequency associated with a single television channel on a television.

47. The system as recited in claim 44, wherein said video channels in said multiplexed channel signal comprise analog video channels, and wherein said decoder means comprises an analog receiver decoder.

48. The system as recited in claim 47, wherein said analog video channels are scrambled before being transmitted to said service module, and wherein said service module includes descrambling means for descrambling the scrambled analog video channels.

49. The system as recited in claim 48, wherein said analog video channels are scrambled using a scrambling technique selected from a group of scrambling techniques including synchronization suppression, spectral inversion, signal jamming, and non-standard frequency modulation.

50. The system as recited in claim 44, wherein said video channels in said multiplexed channel signal comprise digitally compressed video channels, and wherein said decoder means comprises a digital receiver/decoder.

51. The system as recited in claim 50, wherein said digitally compressed video channels are encrypted by said headend system before being transmitted to said service module, and wherein said service module includes decryption means for decrypting the encrypted digitally compressed video channels.

52. The system as recited in claim 44, wherein said video channels in said multiplexed channel signal comprise a combination of analog video channels and digitally compressed video channels, and wherein said decoder means is configured to receive and process bath analog video channels and digitally comprised video channels.

53. The system as recited in claim 52, wherein said analog video channels are scrambled before being transmitted to said service module and said digitally compressed video channels are encrypted before being transmitted to said service module, and wherein said service module includes descrambling means for descrambling the scrambled analog video channels and decryption means for decrypting the encrypted digitally compressed video channels.

54. The system as recited in claim 42, wherein said telecommunication signals comprise telephony signals, and said service module further comprises telephony interface means for connecting telephone calls between a telephony service provider and a telephone connected to a customer interface device at a user's site, wherein when a service request from a user comprises a request to connect a telephone call from said user to another party having telephone services, said processing means checks to determine if said user is authorized for telephony services, and if said user is authorized for said telephony services, said telephony interface means of said service module connects said user telephone call to said telephony service provider, which in turn, connects said telephone call to said another party.

55. The system as recited in claim 54, wherein said telephony interface means of said service module connects said user telephone call to said headend system, which in turn, connects said user telephone call to said telephony service provider, which in turn, connects said telephone call to said another party.

56. The system as recited in claim 42, wherein said telecommunication signals comprise computer data signals, and said service module further comprises computer network interface means for connecting a computer connected to a customer interface device at a user site to a computer network, wherein when a service request from a user comprises a request to connect said computer at said user site to said computer network, said processing means checks to determine if said user is authorized for computer network interface services, and if said user is authorized for said services, said computer network interface means of said service module provides a data connection between said network and said computer connected to said customer interface box.

57. The system as recited in claim 56, wherein said computer network interface means of said service module connects said computer connected to said customer interface device to said headend system, which in turn, connects said computer to said computer network.

58. The system as recited in claim 42, wherein said telecommunication signals comprise forward path data signals, which may include one or more of telephony signals, computer data signals, and information messaging signal, and wherein said forward path data signals are transmitted from said service module to a customer interface device at a user's site at baseband.

59. The system as recited in claim 42, wherein said telecommunication signals comprise forward path data signals, which may include one or more of telephony signals, computer data signals, and information messaging signal, and wherein said forward path data signals are transmitted from said service module to a customer interface device at a user's site by modulating said forward path data signals to a frequency corresponding to a channel frequency and transmitting said forward path data signals to said customer interface device at said channel frequency.

60. The system as recited in claim 42, wherein said telecommunication signals comprise forward path data signals, which include one or more of telephony signals, computer data signals and information messaging signals, and wherein said forward path data signals are transmitted from said service module to a customer interface device at a user's site by modulating said forward path data signals to a frequency above 50 MHz and transmitting said forward path data signals to said customer interface device at said frequency.

61. The system as recited in claim 42, wherein said telecommunication signals comprise forward path data signals, which may include one or more of telephony signals, computer data signals, and information messaging signal, and wherein said forward path data signals are transmitted from said service module to a customer interface device at a user's site by formatting said forward path data signals to a vertical blanking interval (VBI) associated with one or more channels and transmitting said forward path data signals to said customer interface device in said VBI of said one or more channels.

62. The system as recited in claim 42, wherein return path data signals from said customer interface device includes one or more of telecommunication service request signals, telephony signals, computer data signals and information messaging signals, and wherein said return path data signals are transmitted from said customer interface device to said service module by modulating said return path data signals to a return path frequency and transmitting said return path data signals to said customer interface device at said return oath frequency.

63. The system as recited in claim 42, wherein return path data signals from said customer interface device may include one or more of telecommunication service request signals, telephony signals, computer data signals, said information messaging signals, and wherein said return path data signals are transmitted from said customer interface device to said service module by modulating said return path data signals to a frequency between about 4 MHz and about 40 MHz and transmitting said return path data signals to said customer interface device at said frequency.

64. The system as recited in claim 42, wherein return path data signals from said customer interface device may include one or more of telecommunication service request signals, telephony signals, computer data signals, said information messaging signals, and wherein said return path data signals are transmitted from said customer interface device to said service module by transmitting said return path data signal over a communication path which is separate from the communication path in which signals are transmitted from said service module to said customer interface device.

* * * * *

UNITED STATES PATENT AND TRADEMARK OFFICE
CERTIFICATE OF CORRECTION

PATENT NO.    : 6,598,231 B1
DATED         : July 22, 2003
INVENTOR(S)   : Basawapatna et al.

It is certified that error appears in the above-identified patent and that said Letters Patent is hereby corrected as shown below:

Column 9,
Line 49, delete the word "like.", and insert therefor -- like). --.

Column 15,
Line 60, delete the word "die", and insert therefor -- the --.

Column 16,
Lines 13 and 15, delete the word "service", and insert therefor -- services --.

Column 20,
Line 1, before the word "multi-", delete the word -- in --.

Column 23,
Line 20, delete the word "bath", and insert therefor -- both --.

Column 24,
Line 46, delete the word "oath", and insert therefor -- path --.

Signed and Sealed this

Seventh Day of October, 2003

JAMES E. ROGAN
*Director of the United States Patent and Trademark Office*